(12) United States Patent
Zou et al.

(10) Patent No.: US 8,301,818 B2
(45) Date of Patent: Oct. 30, 2012

(54) VIRTUAL HOT PLUGGING OF DEVICES AND VIRTUAL DEVICES

(75) Inventors: Yong Colin Zou, Haidian (CN); Wesley Shao, Union City, CA (US); Govinda Tatti, Cupertino, CA (US); Scott Michael Carter, San Diego, CA (US)

(73) Assignee: Oracle America, Inc., Redwood City, CA (US)

( * ) Notice: Subject to any disclaimer, the term of this patent is extended or adjusted under 35 U.S.C. 154(b) by 495 days.

(21) Appl. No.: 12/636,349

(22) Filed: Dec. 11, 2009

(65) Prior Publication Data
US 2011/0145815 A1 Jun. 16, 2011

(51) Int. Cl.
*G06F 15/163* (2006.01)
(52) U.S. Cl. .............................. 710/302; 718/1; 719/321
(58) Field of Classification Search ...... 718/1; 710/302; 719/321, 324
See application file for complete search history.

(56) References Cited

U.S. PATENT DOCUMENTS

| | | | |
|---|---|---|---|
| 2006/0004554 A1* | 1/2006 | Vega et al. | 703/6 |
| 2008/0244574 A1* | 10/2008 | Shanbhogue et al. | 718/1 |
| 2009/0113422 A1* | 4/2009 | Kani | 718/1 |
| 2009/0164990 A1* | 6/2009 | Ben-Yehuda et al. | 718/1 |
| 2010/0262722 A1* | 10/2010 | Vauthier et al. | 710/8 |
| 2011/0029693 A1* | 2/2011 | Brinkmann et al. | 710/8 |

OTHER PUBLICATIONS

Iwanmatsu, Y., "PCI Hot-Plug for PV Domains" (2008) Xan Summit, Tokyo [retrieved from http://www.xen.org/files/xensummit_tokyo/27_YosukeIwamatsu_en.pdf]. 18 pages.*

* cited by examiner

*Primary Examiner* — H. S. Sough
*Assistant Examiner* — Brian Wathen
(74) *Attorney, Agent, or Firm* — Polsinelli Shughart PC

(57) ABSTRACT

A device list is created for an operating system and/or a virtualized operating system. A bus node is created for each bus. Interface nodes are created as child nodes of the respective bus and a status indicator indicates whether a device connected to the interface is accessible. A device node is created for the device connected to the interface. Virtualized interface nodes are created as child nodes of the device node for each virtual device included in the device and a status indicator indicates whether the respective virtual device is accessible. Then, devices and/or virtual devices may be added and/or removed utilizing the list. After a device and/or virtualized device has been removed for one operating system and/or virtualized operating system, it may then be added to another. In this way, devices and/or virtualized devices can be virtually hot plugged without physically connecting and/or disconnecting devices.

20 Claims, 18 Drawing Sheets

Device List

```
.
.
.
PCI bus
     PCI Slot I (present)
          Network Card
               Virtual Slot I (present)
                    Port1
               Virtual Slot II (present)
                    Port2
               Virtual Slot III (empty)
     PCI Slot II (empty)
.
.
.
```

Device List

- .
- .
- .

PCI bus
    PCI Slot I (empty)
    PCI Slot II (empty)

Device List

```
.
.
.
PCI bus
    PCI Slot I (present)
        Network Card
            Virtual Slot I (present)
                Port1
            Virtual Slot II (empty)
            Virtual Slot III (empty)
    PCI Slot II (empty)
.
.
.
```

Device List

.
.
.

PCI bus
    PCI Slot I (present)
        Network Card
            Virtual Slot I (present)
                Port1
            Virtual Slot II (present)
                Port2
            Virtual Slot III (empty)
    PCI Slot II (present)
        Sound Card

Device List

```
.
.
.
    PCI bus
        PCI Slot I (present)
            Network Card
                Virtual Slot I (present)
                    Port1
                Virtual Slot II (present)
                    Port2
                Virtual Slot III (present)
                    Port3
        PCI Slot II (empty)
.
.
.
```

Operating System Device List

```
.
.
.
PCI Express bus
    PCI Express Slot I (p)
        Sound Card
            Virtual Slot I (p)
                SoundOut
            Virtual Slot II (p)
                SoundIn
            Virtual Slot III (p)
                MIDI
    PCI Express Slot II (e)
    PCI Express Slot III (e)
.
.
.
```
⌎601A

Virtualized Operating System Device List

```
.
.
.
PCI Express bus
    PCI Express Slot I (e)
    PCI Express Slot II (e)
    PCI Express Slot III (p)
        Serial I/O Controller
            Virtual Slot I (p)
                Serial1
            Virtual Slot II (p)
                Serial2
.
.
.
```
⌎602A

FIG. 6A

Operating System Device List

.
.
.
PCI Express bus
    PCI Express Slot I (e)
    PCI Express Slot II (e)
    PCI Express Slot III (e)
.
.
.

601B

Virtualized Operating System
Device List

.
.
.
PCI Express bus
    PCI Express Slot I (p)
        Sound Card
            Virtual Slot I (p)
                SoundOut
            Virtual Slot II (p)
                SoundIn
            Virtual Slot III (p)
                MIDI
    PCI Express Slot II (e)
    PCI Express Slot III (p)
        Serial I/O Controller
            Virtual Slot I (p)
                Serial1
            Virtual Slot II (p)
                Serial2
.
.
.

Operating System Device List

```
.
.
.
PCI Express bus
    PCI Express Slot I (p)
        Sound Card
            Virtual Slot I (p)
                SoundOut
            Virtual Slot II (p)
                SoundIn
            Virtual Slot III (p)
                MIDI
    PCI Express Slot II (e)
    PCI Express Slot III (p)
        Serial I/O Controller
            Virtual Slot I (p)
                Serial1
            Virtual Slot II (p)
                Serial2
.
.
.
```

⌐601C

Virtualized Operating System Device List

```
.
.
.
PCI Express bus
    PCI Express Slot I (e)
    PCI Express Slot II (e)
    PCI Express Slot III (e)
.
.
.
```

Operating System Device List

```
.
.
.
PCI Express bus
    PCI Express Slot I (p)
        Sound Card
            Virtual Slot I (p)
                SoundOut
            Virtual Slot II (p)
                SoundIn
            Virtual Slot III (e)
    PCI Express Slot II (e)
    PCI Express Slot III (e)
.
.
.
```
⌎601D

Virtualized Operating System Device List

```
.
.
.
PCI Express bus
    PCI Express Slot I (p)
        Sound Card
            Virtual Slot I (e)
            Virtual Slot II (e)
            Virtual Slot III (p)
                MIDI
    PCI Express Slot II (e)
    PCI Express Slot III (p)
        Serial I/O Controller
            Virtual Slot I (p)
                Serial1
            Virtual Slot II (p)
                Serial2
.
.
.
```
⌎602D

FIG. 6D

Operating System Device List

```
.
.
.
PCI Express bus
    PCI Express Slot I (p)
        Sound Card
            Virtual Slot I (p)
                SoundOut
            Virtual Slot II (p)
                SoundIn
            Virtual Slot III (p)
                MIDI
    PCI Express Slot II (e)
    PCI Express Slot III (p)
        Serial I/O Controller
            Virtual Slot I (p)
                Serial1
            Virtual Slot II (e)
.
.
.
```
↳601E

Virtualized Operating System Device List

```
.
.
.
PCI Express bus
    PCI Express Slot I (e)
    PCI Express Slot II (e)
    PCI Express Slot III (p)
        Serial I/O Controller
            Virtual Slot I (e)
            Virtual Slot II (p)
                Serial2
.
.
.
```
↳602E

FIG. 6E

First Virtualized Operating System Device List

.
.
.
ISA bus
    ISA Slot I (p)
        Serial/Parallel Card
            Virtual Slot I (p)
                Serial
            Virtual Slot II (p)
                Parallel
    ISA Slot II (p)
        Modem Card
            Virtual Slot I (e)
            Virtual Slot II (p)
                Port2
.
.
.

701C

Second Virtualized Operating System Device List

.
.
.
ISA bus
    ISA Slot I (e)
    ISA Slot II (p)
        Modem Card
            Virtual Slot I (p)
                Port1
            Virtual Slot II (e)
.
.
.

VIRTUAL HOT PLUGGING OF DEVICES AND VIRTUAL DEVICES

FIELD OF THE INVENTION

This invention relates generally to hot plugging, and more specifically to virtual hot plugging of devices and virtual devices.

BACKGROUND

Computing devices (such as desktop computers, laptop computers, server computers, and the like) typically include one or more system buses for connecting devices to the computing device. Some devices connect to computing devices via buses, such as the universal serial bus, that enable the devices to be physically hot plugged. A device is able to be physically hot plugged if it can be physically connected to or disconnected from the bus during operation of the computing device without causing errors or damage to the computing device. Other devices connect to computing devices via buses, such as the PCI (Peripheral Component Interconnect) bus, that might not enable the devices to be physically hot plugged. Connecting a PCI device to the PCI bus or disconnecting a PCI device from the PCI bus during operation of the computing device causes errors in the computing device and may even physically damage the computing device.

Multifunction devices, i.e. devices that include multiple functions that are separately utilizable by a computing device, implement the various functions with "virtual devices". Being functional components of the device, virtual devices are not separately hot pluggable. If a multifunction device is physically hot plugged, the virtual devices are all added and/or removed along with the physical/actual device. If the multifunction device is not physically hot pluggable, the virtual devices of that device cannot be added or removed during operation of the computing device.

Operating systems (such as Solaris™, Windows™, OS X™ or the like) that execute on computing devices typically use a device list to interact with devices connected to the computing device. A device list often involves a tree structure of nodes describing the buses connected to the computing device and the devices connected to those buses. The nodes of the device list typically include information that the operating system uses to interact with a respective device. Commonly, the device list is fixed with respect to most devices when the operating system boots up. In other words, the device list is typically not able to change during the operation of the computing device. To allow physically hot pluggable devices to be added to and/or removed during operation of the computing device, device lists typically treat physically hot pluggable devices differently than devices that are not physically hot pluggable. The device lists typically accomplish this by including attachment points for the physically hot pluggable connectors (or interfaces) of the bus. If a device is connected to the connector, the device is represented in the list as a child node of the respective attachment point and the attachment point is indicated as having a device connected. If a device is not connected to the connector, the attachment point has no child node and is indicated as not having a device connected. The device list is operable to be updated for physical hot plugging of a device by updating the status of the attachment point in the list and either adding or removing the child node of the attachment point. Thus, the attachment point enables the device list to change in response to physically hot plugging a device even though the device list is fixed with respect to devices that are not physically hot pluggable.

Virtualized operating systems are operating systems and/or virtual machines that execute within an environment provided by another operating system executing on a computing device. Virtualized operating systems may include operating systems such as Solaris™, Windows™, OS X™ or the like and/or virtual machines such as the Java Virtual Machine™ or the like. Virtualized operating systems are typically executed within an operating system on a computing device for a variety of purposes, such as to enable multiple copies of an operating system to execute on a computing device, to enable different operating systems to execute on a computing device, to control access to the resources of the computing device, and/or to separate different computational activity occurring on the computing device. Virtualized operating systems typically use a virtualized device list to interact with devices connected to the computing device. A virtualized device list is similar to a device list, other than that it is a device list for a virtualized operating system.

Thus, although typical device lists and virtualized device lists enable adding and removing devices that are able to be physically hot plugged during operation of a computing device, they do not support adding or removing devices that are not able to be physically hot plugged. Typical device lists and virtualized device lists also do not enable virtually hot plugging devices (adding or removing devices for an operating system or virtualized operating system without physically connecting/disconnecting the devices from the respective bus) or hot plugging of virtual devices.

SUMMARY

The present disclosure describes systems and methods that provide the ability for virtually hot plugging devices and/or virtual devices. A device list is created for an operating system and/or a virtualized device list is created for a virtualized operating system executing on a computing device. A bus node is created in the respective device list for each bus connected to the computing device. Interface nodes for one or more interfaces of a bus are created in the respective device list as child nodes of the respective bus. A status indicator included in the interface node indicates whether a device connected to the interface is accessible by the operating system or virtualized operating system. A device node is created in the list for the device connected to the interface. Virtualized interface nodes are created as child nodes of the device node for each virtual device included in the device. A status indicator included in the virtualized interface node indicates whether the respective virtual device is accessible.

Subsequent to creation of the device list and/or virtualized device list, one or more devices and/or virtual devices may be added and/or removed for the operating system and/or virtualized operating system utilizing the list. A device and/or virtual device may be removed for the operating system and/or virtualized operating system by unloading one or more software drivers, removing the device node and/or virtualized device node, and updating the status indicator of the appropriate interface node and/or virtual interface node. A device and/or virtual device may be added for the operating system and/or virtualized operating system by adding an appropriate device node and/or virtualized device node, updating the status indicator of the appropriate interface node and/or virtualized interface node, and loading one or more software drivers.

After a device and/or virtualized device has been removed for one operating system and/or virtualized operating system executing on the computing device, it may then be added to another operating system and/or virtualized operating system executing on the computing device. In this way, devices and/or virtualized devices can be virtually hot plugged without physically connecting and/or disconnecting devices from the respective bus.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The present disclosure may be better understood, and its numerous features made apparent to those skilled in the art by referencing the accompanying drawings.

FIG. 5A is a diagram illustrating a first example implementation of the methods of FIGS. 2, 3A, and 3B;

FIG. 5B is a diagram illustrating the example implementation of FIG. 5A after a virtual hot plug operating removing a device;

FIG. 5C is a diagram illustrating the example implementation of FIG. 5A after a virtual hot plug operating removing a virtual device;

FIG. 5D is a diagram illustrating the example implementation of FIG. 5A after a virtual hot plug operating adding a device;

FIG. 5E is a diagram illustrating the example implementation of FIG. 5A after a virtual hot plug operating adding a virtual device;

FIG. 6A is a diagram illustrating a second example implementation of the methods of FIGS. 2, 3A, and 3B;

FIG. 6B is a diagram illustrating the example implementation of FIG. 6A after a virtual hot plug operating removing a device for the operating system and adding the device for the virtualized operating system;

FIG. 6C is a diagram illustrating the example implementation of FIG. 6A after a virtual hot plug operating removing a device for the virtualized operating system and adding the device for the operating system;

FIG. 6D is a diagram illustrating the example implementation of FIG. 6A after a virtual hot plug operating removing a virtual device for the operating system and adding the virtual device for the virtualized operating system;

FIG. 6E is a diagram illustrating the example implementation of FIG. 6A after a virtual hot plug operating removing a virtual device for the virtualized operating system and adding the virtual device for the operating system;

FIG. 7C is a diagram illustrating the example implementation of FIG. 7A after a virtual hot plug operating removing a virtual device for the second virtualized operating system and adding the virtual device for the first virtualized operating system.

DETAILED DESCRIPTION

Figure 1:
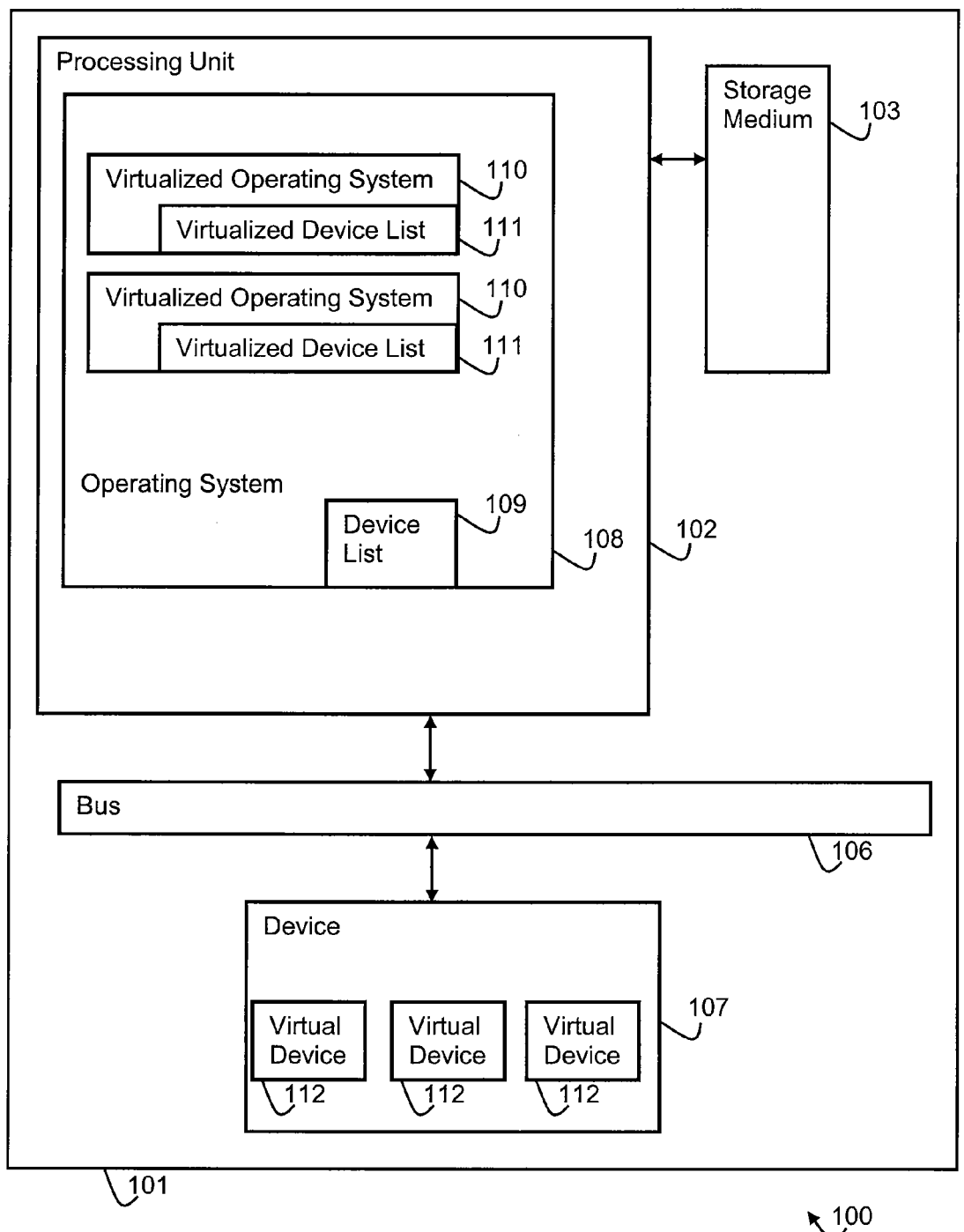
FIG. 1 is a block diagram illustrating a system 100 for virtual hot plugging, in accordance with an embodiment of the present disclosure.

The present disclosure describes systems and methods that provide the ability for virtually hot plugging devices, or add or remove devices for an operating system or a virtualized operating system without physically connecting/disconnecting the devices from a bus. Each connector of a bus of a computing system is represented in the device list (or virtualized device list) as a child node of the respective bus and includes a status indicating whether a device is connected to that connector. If a device is connected to a connector, the device is listed as a child node of the connector. A device can be removed or added during operation by deleting or adding the node for the device, updating the status of the connector, and unloading or loading software drivers for the device. Thus, any device can be virtually hot plugged regardless of whether the device can be physically added or removed from the computing device.

Virtual hot plugging as discussed herein also provides the ability to hot plug virtual devices. Each virtual device of a device is represented in the device list as a child node of a virtual connector (interface), the virtual connector in turn being represented as a child node of the device. Each virtual connector includes a status indicating whether the child virtual device is accessible. A virtual device can be removed or added, even separately from the device to which it belongs, during operation by deleting or adding the node for the virtual device, updating the status of the connector, and unloading or loading software drivers for the virtual device. Thus, any virtual device can be virtually hot plugged.

Virtual hot plugging of devices and/or virtual devices provides flexibility. If a device is causing problems but cannot be physically hot plugged, the device can be virtually hot plugged to allow the operating system to continue operating until the computing system can be powered down to repair or replace the device. Also, if computing system utilizes two devices that cannot operate at the same time (perhaps if the devices or software drivers for the devices conflict), the devices can be alternatively virtually hot plugged so that only one of the devices is present for the operating system at a given time. Further, storage of the device list requires resources of the computing device and the amount of resources required to store the device list can be controlled by virtually hot plugging devices and/or virtual devices to control the size of the device list.

Virtual hot plugging of devices and/or virtual devices provides additional flexibility in the case of virtualized operating systems. During operation of the computing device, devices and/or virtual devices can be moved between an operating system and a virtualized operating system on a computing device and/or between one virtualized operating system and another. This enables reconfiguration of the resources of the computing device between the operating system and/or the various virtualized operating systems without powering off the computing device. As reconfiguration can be performed while a computing device that utilized virtualized operating systems is operating, loss of computing time and/or service interruptions will not occur due to the need for reconfiguration.

FIG. 1 illustrates a system 100 for virtual hot plugging, in accordance with an embodiment of the present disclosure. The system 100 involves a computing device 101 that includes a processing unit 102 and a tangible machine-readable storage media 103. The system also includes a device 107 communicably coupled to the processing unit 102 via a bus 106, such as a PCI (Peripheral Component Interconnect) bus, a PCI Express bus, an ISA (Industry Standard Architecture) bus, or other kind of computing device system bus. The processing unit 102 executes instructions stored in the storage medium 103 to implement an operating system 108 which includes a device list 109 that the operating system 108 utilizes to interact with devices (such as device 107) and/or virtual devices (such as virtual devices 112) coupled to the processing unit 102. The operating system 108 may comprise any kind of operating system, such as Solaris™, Windows™, OS X™ or the like.

The processing unit 102 may also execute instructions stored in the storage medium 103 to implement one or more virtualized operating systems 110 which execute within the operating system 108. The one or more virtualized operating systems 110 may each comprise any kind of operating system, such as Solaris™, Windows™, OS X™ or the like. The one or more virtualized operating systems 110 may each include a virtualized device list 111 (i.e. a device list for a virtualized operating system) that the one or more virtualized operating systems 110 utilize to interact with devices (such as device 107) and/or virtual devices (such as virtual devices 112) coupled to the processing unit 102. Although the processing unit 102 is illustrated as implementing two virtualized operating systems 110 executing within the operating system 108, it is understood that the processing unit 102 may implement any number of virtualized operating systems executing within the operating system 108 (such as five or none) without departing from the scope of the present disclosure.

The device 107 may not be capable of being physically hot plugged, i.e. not capable of being physically added to the computing device 101 and/or removed from the computing device 101 during the operation of the computing device 101 without causing hardware and/or software errors. Hence, to add the device 107 to the computing device 101 and/or to remove the device 107 from the computing device 101 without causing errors, it may be necessary to power off the computing device 101.

The device 107 includes a plurality of virtual devices 112. A device includes virtual devices when the device is a multi-function device, i.e. the device includes multiple functions that are separately utilizable by a computing device. For example, a PCI Ethernet network card may include six separately utilizable Ethernet ports and each Ethernet port would constitute a separate virtual device. As illustrated, the device 107 includes three functions that are separately utilizable by the computing device 101 which are represented as the three virtual devices 112. However, it is understood that the device 107 may include any number of functions, such as two or fifteen, which are separately utilizable and thus the device 107 may include any number of virtual devices 112 without departing from the scope of the present disclosure.

While the system 100 has been described as including computing device 101, a single processing unit 102, and a single storage medium 103, it will be understood that system 100 is illustrative and that multiple computing devices 101 (which may be communicably coupled), multiple processing units 102, and/or multiple storage media 103 may be utilized without departing from the scope of the present disclosure.

The tangible machine-readable storage medium 103 may include, but is not limited to, magnetic storage media (e.g., floppy diskette), optical storage media (e.g., CD-ROM); magneto-optical storage media, read only memory, random access memory, erasable programmable memory (e.g., EPROM and EEPROM), flash memory, and other types of memory and media suitable for storing electronic information. The computing device 101 may also include (not shown) one or more input and/or output devices (including, but not limited to displays, keyboards, mice, printers, scanners, and so forth), one or more buses (including, but not limited to, universal serial bus, small computer system interface, and so forth), and/or one or more communication components (including, but not limited to, modems, Ethernet adapters, wireless Ethernet adapters, and so forth).

Figure 2:
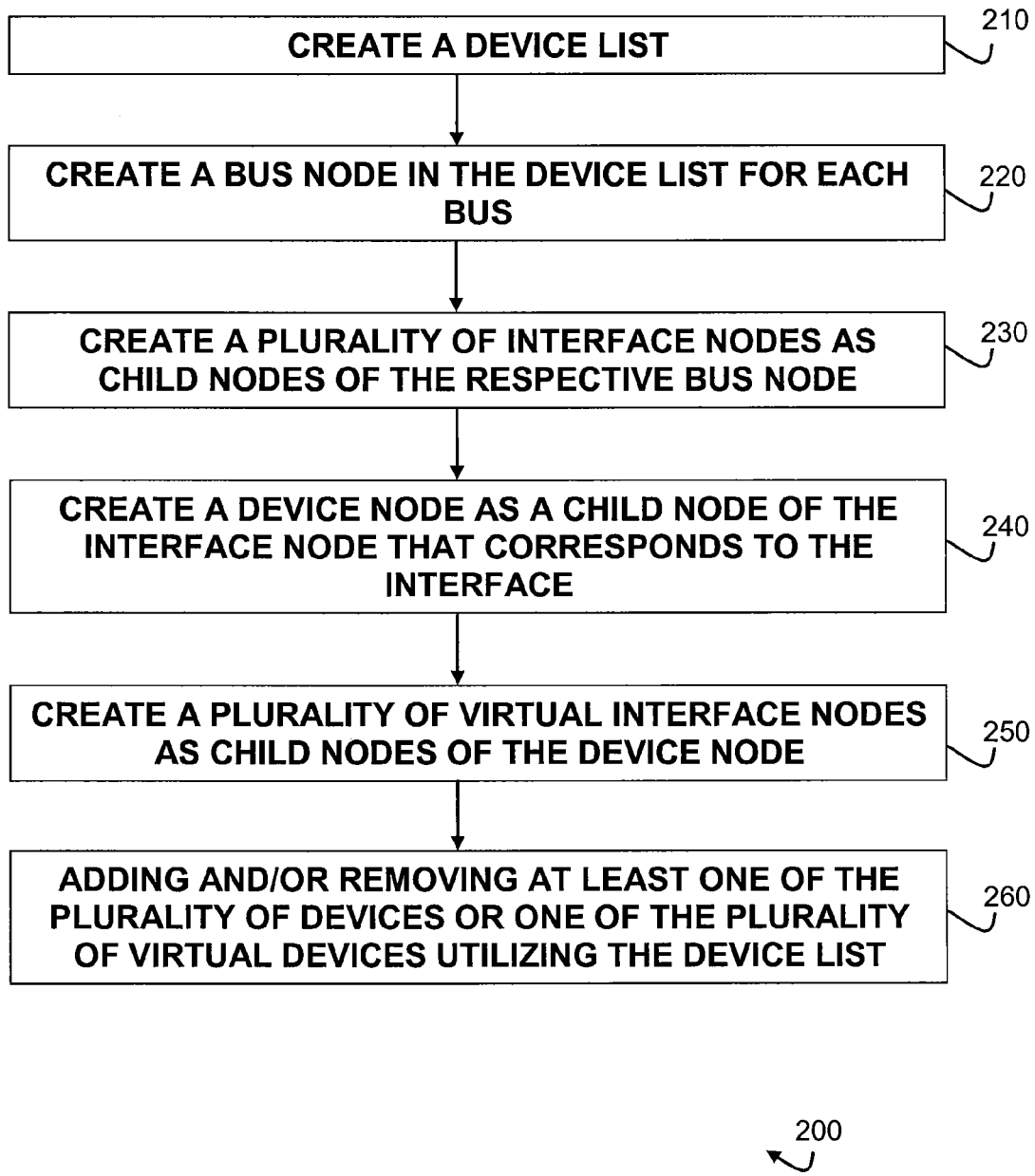
FIG. 2 is a method diagram illustrating a method for virtual hot plugging, which may be performed by the system of FIG. 1, in accordance with an embodiment of the present disclosure.

FIG. 2 illustrates a method 200 for virtual hot plugging, which may be performed by the system 100, in accordance with an embodiment of the present disclosure. The method 200 may comprise a computer-implemented method. The computer-implemented method may be performed by a processing unit, such as the processing unit 101, executing one or more sets of instructions included in a computer program product stored in the tangible machine-readable medium 103.

In a first operation 210, the processing unit 102 creates a device list. The device list may be the device list 109 for the operating system 108. The operating system 108 may utilize the device list 109 to interact with devices and/or virtual devices coupled to the processing unit 102. The device list may be stored in the tangible machine-readable storage media 103.

In a second operation 220, the processing unit 102 creates a bus node in the device list for each bus (such as bus 106) connected to the computing device 101. Each bus may include a plurality of interfaces, or connectors, that allow devices to be coupled to the respective bus.

In a third operation 230, the processing unit 102 creates a plurality of interface nodes in the device list as child nodes of the respective bus node. Each interface node may correspond to one of the plurality of interfaces of the respective bus. The interface nodes may each include a status indicator. The status indicator indicates whether the operating system 108 is able to access a device via the corresponding interface, such as whether a device is presently connected to the interface, the interface is empty, and/or a device connected to the interface is enabled.

In a fourth operation 240, the processing unit 102 creates a device node in the device list. The device node corresponds to a device coupled to an interface of a bus of the computing device 101 and the processing unit 102 creates the device node as a child node of the interface node that corresponds to the interface to which the device is coupled. The device includes a plurality of virtual devices, i.e. multiple functions of the device that are separately utilizable by the computing device 101.

In a fifth operation 250, the processing unit 102 creates a plurality of virtual interface nodes in the device list as child nodes of the device node. The processing unit 102 creates a virtual interface node for each of the plurality of virtual devices included in the device. The virtual interface nodes may each include a status indicator. The status indicator indicates whether the operating system 108 is able to access the corresponding virtual device, such as whether the virtual device is present or absent.

In a sixth operation 260, the processing unit 102 performs at least one of adding and/or removing one or more devices and/or virtual devices utilizing at least the device list.

Method 200 has been described in the context of creating the device list 109 for the operating system 108 and virtually hot plugging utilizing at least the device list 109. However, the processing unit 102 may perform method 200 to create a virtualized device list 111 for one or more virtualized operating systems 110, either in addition to or instead of device list 109, and virtually hot plugging may utilize device list 109 and/or one or more virtualized device lists 111 without departing from the scope of the present disclosure. A virtualized device list is simply a device list for a virtualized operating system. Similarly, a virtualized bus node is a bus node in a device list for a virtualized operating system, a virtualized interface node is an interface node in a device list for a virtualized operating system, a virtualized device node is a device node in a device list for a virtualized operating system, a virtualized virtual interface node is a virtual interface node in a device list for a virtualized operating system, and a virtualized virtual device node is a virtual device node in a device list for a virtualized operating system.

Figure 3A:
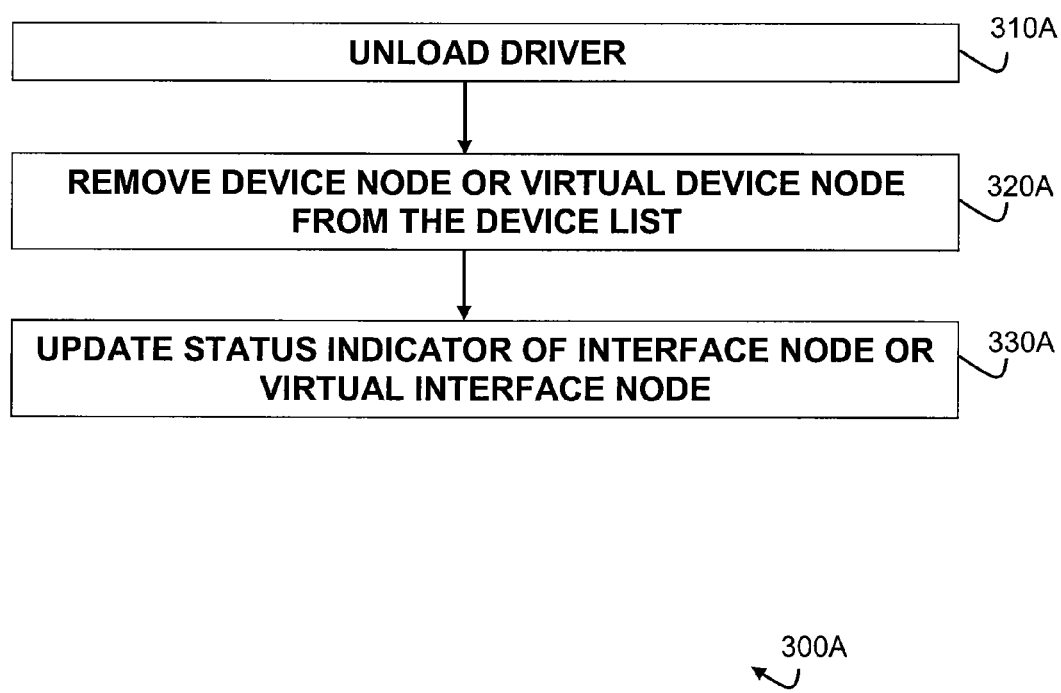
FIG. 3A is a method diagram illustrating a method for removing one or more devices and/or virtual devices, which may be performed by method of FIG. 2.
Figure 3B:
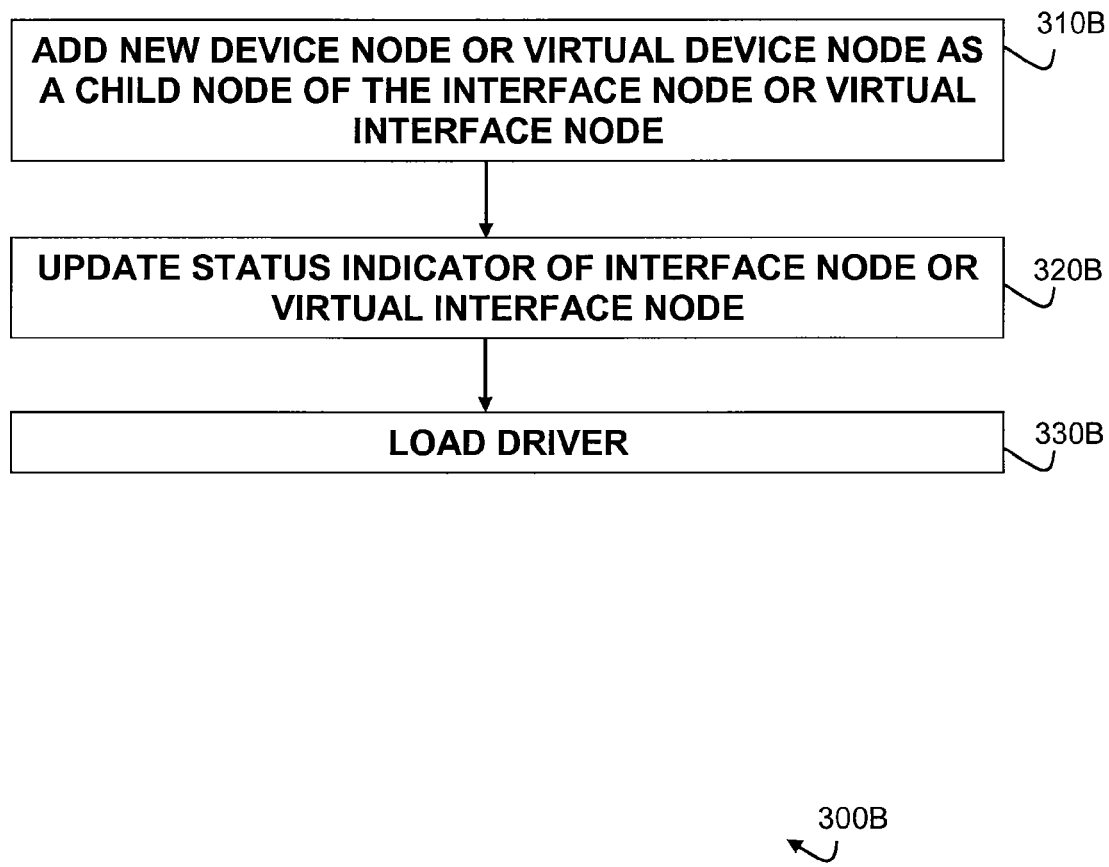
FIG. 3B is a method diagram illustrating a method for adding one or more devices and/or virtual devices, which may be performed by method of FIG. 2.

FIGS. 3A and 3B illustrate methods 300A and 300B, respectively, of virtual hot plugging that may be performed by the processing unit 102 in performing operation 260. The processing unit 102 may perform the methods 300A and/or 300B, respectively, to add and/or remove one or more devices 107 and/or virtual devices 112 for the operating system 108 and/or one or more of the virtualized operating systems 110 utilizing the device list 109 and/or one or more virtualized device lists 111.

The processing unit 102 may perform either method 300A or 300B as part of performing operation 260 or may perform both methods 300A and 300B in performing operation 260. For example, the processing unit 102 may perform method 300A to remove a device 107 and/or virtual device 112 for the operating system 108 and/or one or more of the virtualized operating systems 110 as part of performing operation 260. By way of another example, the processing unit 102 may perform method 300B to add a device 107 and/or virtual device 112 for the operating system 108 and/or one or more of the virtualized operating systems 110 as part of performing operation 260. By way of still another example, the processing unit may perform method 300A to remove a device 107 and/or virtual device 112 for the operating system 108 and/or one or more of the virtualized operating systems 110 and then method 300B to add the device 107 and/or virtual device 112 for the operating system 108 and/or one or more of the virtualized operating systems 110 as part of performing operation 260.

FIG. 3A illustrates a method 300A for removing one or more devices 107 and/or virtual devices 112 for the operating system 108 and/or one or more of the virtualized operating systems 110 utilizing the device list 109 and/or one or more virtualized device lists 111. In a first operation 310A, the processing unit 102 unloads one or more software drivers for the device 107 and/or virtual device 112 for the operating system 108 and/or the one or more virtualized operating systems 110.

In a second operation 320A, the processing unit 102 removes the device node and/or virtual device node that corresponds to the device 107 and/or virtual device 112 from the device list 109 and/or one or more virtualized device lists 111.

In a third operation 330A, the processing unit 102 updates the status indicator of the interface node and/or virtual interface node that is the parent node of the device node and/or virtual device node corresponding to the device 107 and/or virtual device 112 to be removed. The status indicator is updated to indicate that the device is not accessible by the operating system 108 via the interface and/or the one or more virtualized operating systems 110 and/or the virtual device is not accessible by the operating system 108 and/or the one or more virtualized operating systems 110.

FIG. 3B illustrates a method 300B for adding one or more devices 107 and/or virtual devices 112 for the operating system 108 and/or one or more of the virtualized operating systems 110 utilizing the device list 109 and/or one or more virtualized device lists 111. In a first operation 310B, the processing unit 102 adds a new device node or virtual device node for the device 107 and/or virtual device 112 to the device list 109 and/or the one or more virtualized device lists 111 as a child node of the respective interface node and/or virtual interface node.

In a second operation 320B, the processing unit 102 updates the status indicator of the respective interface node and/or virtual interface node. The status indicator is updated to indicate that the device is accessible by the operating system 108 via the interface and/or the one or more virtualized operating systems 110 and/or the virtual device is accessible by the operating system 108 and/or the one or more virtualized operating systems 110.

In a third operation 330B, the processing unit 102 loads one or more software drivers for the device 107 and/or virtual device 112 for the operating system 108 and/or the one or more virtualized operating systems 110.

Figure 4:
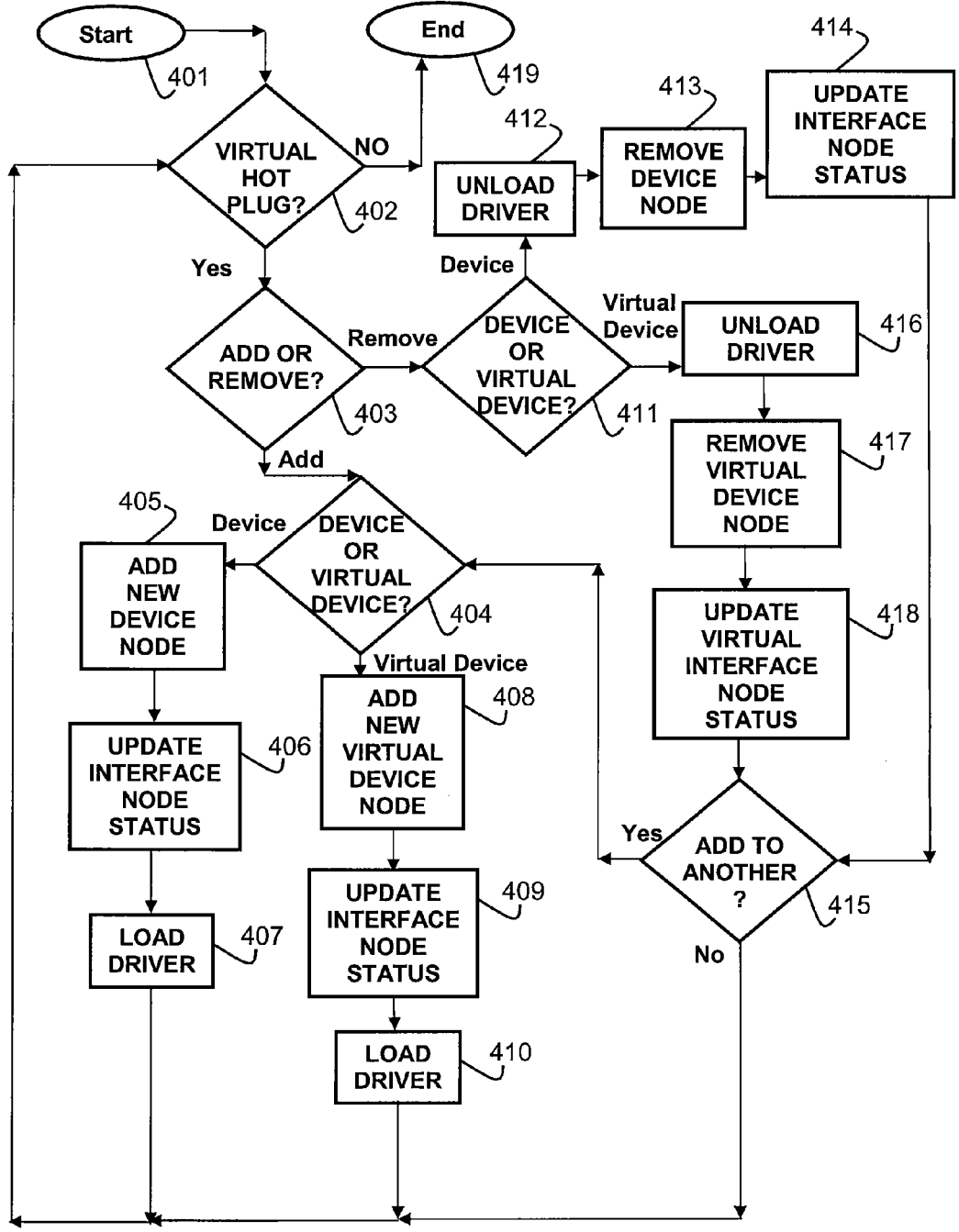
FIG. 4 is a flow chart illustrating an example flow of an implementation of the methods of FIGS. 2, 3A, and 3B in accordance with the present disclosure.

FIG. 4 illustrates the flow 400 of an example implementation of the performance of methods 200, 300A, and 300B by the processing unit 102. The flow starts at block 401 and proceeds to block 402 where the processing unit 102 determines whether to perform a virtual hot plug operation for the operating system 108 and/or one or more of the virtualized operating systems 110. If the processing unit 102 determines to perform a virtual hot plug operation, the flow proceeds to block 403. If the processing unit 102 determines not to perform a virtual hot plug operation, the flow proceeds to block 419 and ends.

At block 403, the processing unit 102 determines whether to add or remove a device or virtual device. If the processing unit 102 determines to add a device or virtual device, the flow proceeds to block 404. If the processing unit 102 determines to remove a device or virtual device, the flow proceeds to block 411.

At block 404, the processing unit 102 determines whether to add a device or virtual device. If the processing unit 102 determines to add a device, the flow proceeds to block 405. If the processing unit 102 determines to add a virtual device, the flow proceeds to block 408.

At block 405, the processing unit 102 adds a device node for the device as a child node of the interface node that corresponds to the device and the flow proceeds to block 406. At block 406, the processing unit 102 updates the status indicator of the corresponding interface node to indicate that the device is accessible via the interface and the flow proceeds to block 407. At block 407, the processing unit 102 loads one or more drivers for the device and the flow proceeds to block 402.

At block 408, the processing unit 102 adds a virtual device node for the virtual device as a child node of the virtual interface node that corresponds to the virtual device and the flow proceeds to block 409. At block 409, the processing unit 102 updates the status indicator of the corresponding virtual interface node to indicate that the virtual device is accessible and the flow proceeds to block 410. At block 410, the processing unit 102 loads one or more drivers for the virtual device and the flow proceeds to block 402.

At block 411, the processing unit 102 determines whether to remove a device or virtual device. If the processing unit 102 determines to remove a device, the flow proceeds to block 412. If the processing unit 102 determines to remove a virtual device, the flow proceeds to block 416.

At block 412, the processing unit 102 unloads one or more drivers for the device and the flow proceeds to block 413. At block 413, the processing unit 102 removes the device node for the device and the flow proceeds to block 414. At block 414, the processing unit 102 updates the status indicator of the interface node that is a parent node of the device node that corresponds to the device to indicate that the device is not accessible via the respective interface and the flow proceeds to block 415.

At block 416, the processing unit 102 unloads one or more drivers for the virtual device and the flow proceeds to block 417. At block 417, the processing unit 102 removes the virtual device node for the virtual device and the flow proceeds to block 418. At block 418, the processing unit 102 updates the status indicator of the virtual interface node that is a parent node of the virtual device node that corresponds to the virtual device to indicate that the virtual device is not accessible and the flow proceeds to block 415.

At block 415, the processing unit 102 determines whether to add the removed device or virtual device to another of the operating system 108 and/or one or more of the virtualized operating systems 110. If the processing unit 102 determines to add the removed device or virtual device to another of the operating system 108 and/or one or more of the virtualized operating systems 110, the flow proceeds to block 404. If the processing unit 102 determines not to add the removed device or virtual device to another of the operating system 108 and/or one or more of the virtualized operating systems 110, the flow proceeds to block 402.

FIGS. 5A-5E are block diagrams illustrating a first sample implementation of the performance of methods 200, 300A, and 300B by a processing unit of a computing device, such as the computing device 101. FIG. 5A illustrates a portion of the device list 500A for an operating system of the computing device that corresponds to a PCI bus. It is understood that the illustrated portion of the device list 500A is simplified for purposes of example and that the actual device list for the operating system of the computing device may contain other nodes corresponding to other aspects of the computing device other than the PCI bus and nodes of the actual device list may include more information for interacting with devices connected to the computing device than illustrated.

As illustrated, the device list 500A includes a bus node for the PCI bus. In this example, the PCI bus includes two interfaces and the device list 500A includes an interface node (PCI Slot I and PCI Slot II) for each of the two interfaces. The PCI Slot I interface node includes a child device node for a Network Card device and a status indicator indicating that the Network Card device is present, i.e. accessible by the operating system via PCI Slot I. The PCI Slot II interface node does not include a child device node and the status indicator for the PCI Slot II interface node indicates that the PCI Slot II interface is empty, i.e. there is no device accessible by the operating system via PCI Slot II.

In this example, the Network Card device includes three virtual devices, or separately utilizable network ports. This is illustrated as the three virtual interface nodes (Virtual Slot I, Virtual Slot II, and Virtual Slot III) that are child nodes of the Network Card device node. Virtual Slot I includes a child virtual device node Port1 and a status indicator indicating that Port1 is accessible by the operating system. Virtual Slot II includes a child virtual device node Port2 and a status indicator indicating that Port2 is accessible by the operating system. Virtual Slot III does not include a child virtual device node and the status indicator for Virtual Slot III indicates that a virtual device is not accessible by the operating system.

FIG. 5B illustrates the device list 500B after the performance of a virtual hot plug operation utilizing the device list 500A that removes the Network Card device for the operating system. As illustrated, the device node for the Network Card device, as well as all child nodes of the Network Card device node, has been removed from the device list 500B and the status indicator for the PCI Slot I interface node has been updated to indicate that the Network Card device is not accessible by the operating system via PCI Slot I.

FIG. 5C illustrates the device list 500C after the performance of a virtual hot plug operation utilizing the device list 500A that removes the Port2 virtual device for the operating system. As illustrated, the virtual device node for the Port2 virtual device has been removed from the device list 500C and the status indicator for the Virtual Slot II virtual interface node has been updated to indicate that the Port2 virtual device is not accessible by the operating system.

FIG. 5D illustrates the device list 500D after the performance of a virtual hot plug operation utilizing the device list 500A that adds a Sound Card device for the operating system. In this example, the Sound Card device is connected to the PCI bus via PCI Slot II and does not include any virtual devices. As illustrated, a device node for the Sound Card device has been added to the device list 500D as a child node of the PCI Slot II interface node and the status indicator for the PCI Slot II interface node has been updated to indicate that the Sound Card device is accessible by the operating system via PCI Slot II. Because the Sound Card device does not include any virtual devices, no virtual device interface nodes have been added as child nodes of the Sound Card device node.

FIG. 5E illustrates the device list 500E after the performance of a virtual hot plug operation utilizing the device list 500A that adds the Port3 virtual device of the Network Card device for the operating system. As illustrated, a virtual device node for the Port3 virtual device has been added to the device list 500D as a child node of the Virtual Slot III virtual interface node and the status indicator for the Virtual Slot III interface node has been updated to indicate that the Port3 virtual device is accessible by the operating system.

FIGS. 6A-6E are block diagrams illustrating a second sample implementation of the performance of methods 200, 300A, and 300B by a processing unit of a computing device, such as the computing device 101. In this example, the processing unit of the computing device is executing an operating system and a virtualized operating system within the operating system. FIG. 6A illustrates a portion of the device list 601A for the operating system that corresponds to a PCI Express bus and a portion of the virtualized device list 602A for the virtualized operating system that corresponds to the PCI Express bus. It is understood that the illustrated portions of the device list 601A and the virtualized device list 602A are simplified for purposes of example and that the actual device lists for the operating system and virtualized operating system may contain other nodes corresponding to other aspects of the computing device other than the PCI Express bus and nodes of the actual device lists may include more information for interacting with devices connected to the computing device than illustrated.

As illustrated, the device list 601A includes a bus node for the PCI Express bus. In this example the PCI Express bus includes three interfaces and the device list 601A includes an interface node (PCI Express Slot I, PCI Express Slot II, and PCI Express Slot III) for each of the three interfaces. Also as illustrated, the virtualized device list 602A includes a virtualized bus node for the PCI Express bus and a virtualized interface node (PCI Express Slot I, PCI Express Slot II, and PCI Express Slot III) for each of the three interfaces of the PCI Express Bus.

In the device list 601A, the PCI Express Slot I interface node includes a child device node for a Sound Card device and a status indicator indicating that the Sound Card device is present, i.e. accessible by the operating system via PCI Express Slot I. The PCI Express Slot II interface node in the device list 601A does not include a child device node and the status indicator for the PCI Express Slot II interface node indicates that the PCI Express Slot II interface is empty, i.e. there is no device accessible by the operating system via PCI Express Slot II. Similarly, the PCI Express Slot III interface node in the device list 601A does not include a child device node and the status indicator for the PCI Express Slot II interface node indicates that the PCI Express Slot III interface is empty, i.e. there is no device accessible by the operating system via PCI Express Slot III.

In the virtualized device list 602A, the PCI Express Slot I virtualized interface node does not include a child virtualized device node and the status indicator for the PCI Express Slot I virtualized interface node indicates that the PCI Express Slot I interface is empty, i.e. there is no device accessible by the virtualized operating system via PCI Express Slot I. Similarly, the PCI Express Slot II virtualized interface node in the virtualized device list 602A does not include a child virtualized device node and the status indicator for the PCI Express Slot II virtualized interface node indicates that the PCI Express Slot II interface is empty, i.e. there is no device accessible by the virtualized operating system via PCI Express Slot II. The PCI Express Slot III virtualized interface node includes a child virtualized device node for a Serial Input/Output Controller device and a status indicator indicating that the Serial Input/Output Controller device is present, i.e. accessible by the virtualized operating system via PCI Express Slot III.

In this example, the Sound Card device includes three virtual devices, or separately utilizable sound out, sound in, and MIDI (musical instrument digital interface). This is illustrated in the device list 601A as the three virtual interface nodes (Virtual Slot I, Virtual Slot II, and Virtual Slot III) that are child nodes of the Sound Card device node. Virtual Slot I includes a child virtual device node SoundOut and a status indicator indicating that SoundOut is accessible by the operating system. Virtual Slot II includes a child virtual device node SoundIn and a status indicator indicating that SoundIn is accessible by the operating system. Virtual Slot III includes a child virtual device node MIDI and a status indicator indicating that MIDI is accessible by the operating system.

Also in this example, the Serial Input/Output Controller device includes two virtual devices, or separately utilizable serial ports. This is illustrated in the virtualized device list 602A as the two virtualized virtual interface nodes (Virtual Slot I and Virtual Slot II) that are child nodes of the Serial Input/Output Controller virtualized device node. Virtual Slot I includes a child virtualized virtual device node Serial1 and a status indicator indicating that Serial1 is accessible by the virtualized operating system. Virtual Slot II includes a child virtualized virtual device node Serial2 and a status indicator indicating that Serial2 is accessible by the virtualized operating system.

FIG. 6B illustrates the device list 601B and the virtualized device list 602B after the performance of a virtual hot plug operation utilizing the device list 601A and the virtualized device list 602A that removes the Sound Card device for the operating system and adds the Sound Card device for the virtualized operating system. As illustrated, the device node for the Sound Card device, as well as all child nodes of the Sound Card device node, has been removed from the device list 601B and the status indicator for the PCI Express Slot I interface node has been updated to indicate that the Sound Card device is not accessible by the operating system via PCI Slot I. Also as illustrated, a virtualized device node for the Sound Card device, as well as all child nodes of the Sound Card virtualized device node, has been added to the virtualized device list 602B and the status indicator for the PCI Express Slot I virtualized interface node has been updated to indicate that the Sound Card device is accessible by the virtualized operating system via PCI Slot I.

FIG. 6C illustrates the device list 601C and the virtualized device list 602C after the performance of a virtual hot plug operation utilizing the device list 601A and the virtualized device list 602A that removes the Serial Input/Output Controller Card device for the virtualized operating system and adds the Serial Input/Output Controller device for the operating system. As illustrated, the virtualized device node for the Serial Input/Output Controller device, as well as all child nodes of the Serial Input/Output Controller virtualized device node, has been removed from the virtualized device list 602C and the status indicator for the PCI Express Slot III virtualized interface node has been updated to indicate that the Serial Input/Output Controller device is not accessible by the virtualized operating system via PCI Slot Ill. Also as illustrated, a device node for the Serial Input/Output Controller device, as well as all child nodes of the Serial Input/Output Controller device node, has been added to the device list 601C and the status indicator for the PCI Express Slot III interface node has been updated to indicate that the Serial Input/Output Controller device is accessible by the operating system via PCI Slot III.

FIG. 6D illustrates the device list 601D and the virtualized device list 602D after the performance of a virtual hot plug operation utilizing the device list 601A and the virtualized device list 602A that removes the MIDI virtual device for the operating system and adds the MIDI virtual device for the virtualized operating system. As illustrated, the virtual device node for the MIDI virtual device has been removed from the device list 601D and the status indicator for the Virtual Slot III virtual interface node has been updated to indicate that the MIDI virtual device is not accessible by the operating system. Also as illustrated, a virtualized virtual device node for the MIDI virtual device has been added to the virtualized device list 602D. In order for the MIDI virtualized virtual device node to be added in the correct position in the virtualized device list 602D, a virtualized device node (as well as child virtualized virtual interface nodes Virtual Slot I, Virtual Slot II, and Virtual Slot III) for the Sound Card device has been added to the virtualized device list 602D and the status indicator for the PCI Express Slot I virtualized interface node indicates that the Sound Card device is accessible by the virtualized operating system via PCI Slot I. Also, the Virtual Slot III virtualized interface node status indicator indicates that the MIDI virtual device is accessible by the virtualized operating system.

FIG. 6E illustrates the device list 601E and the virtualized device list 602E after the performance of a virtual hot plug operation utilizing the device list 601A and the virtualized device list 602A that removes the Serial1 virtual device for the virtualized operating system and adds the Serial1 virtual device for the operating system. As illustrated, the virtualized virtual device node for the Serial1 virtual device has been removed from the virtualized device list 602E and the status indicator for the Virtual Slot I virtualized virtual interface node has been updated to indicate that the Serial1 virtual device is not accessible by the virtualized operating system. Also as illustrated, a virtual device node for the Serial1 virtual device has been added to the device list 601E. In order for the Serial1 virtual device node to be added in the correct position in the virtualized device list 601E, a device node (as well as child virtual interface nodes Virtual Slot I and Virtual Slot II) for the Serial Input/Output Controller device has been added to the device list 601E and the status indicator for the PCI Express Slot III interface node indicates that the Serial Input/Output Controller device is accessible by the operating system via PCI Slot III. Also, the Virtual Slot I interface node status indicator indicates that the Serial1 virtual device is accessible by the operating system.

Figure 7A:
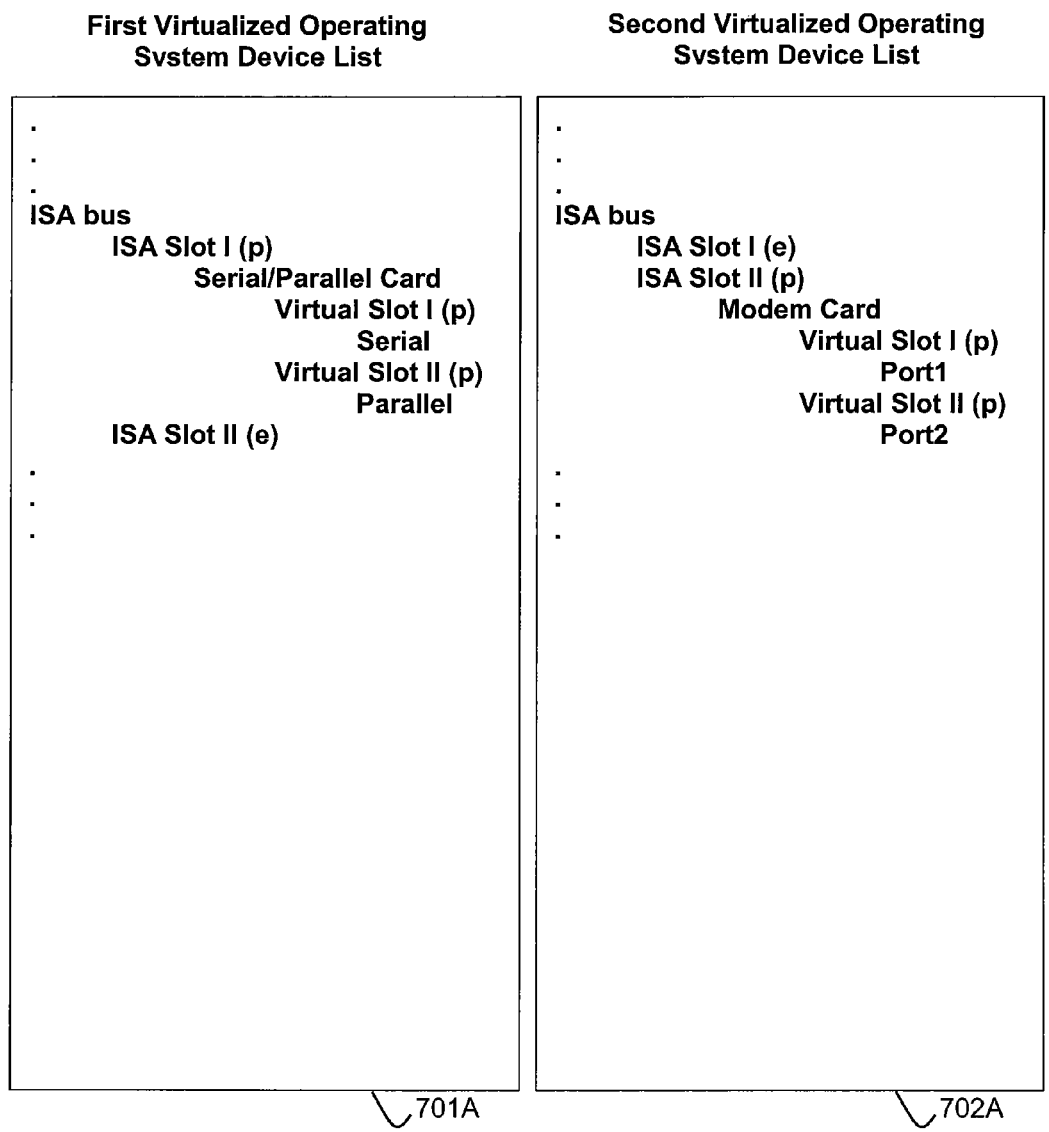
FIG. 7A is a diagram illustrating a third example implementation of the methods of FIGS. 2, 3A, and 3B.
Figure 7B:
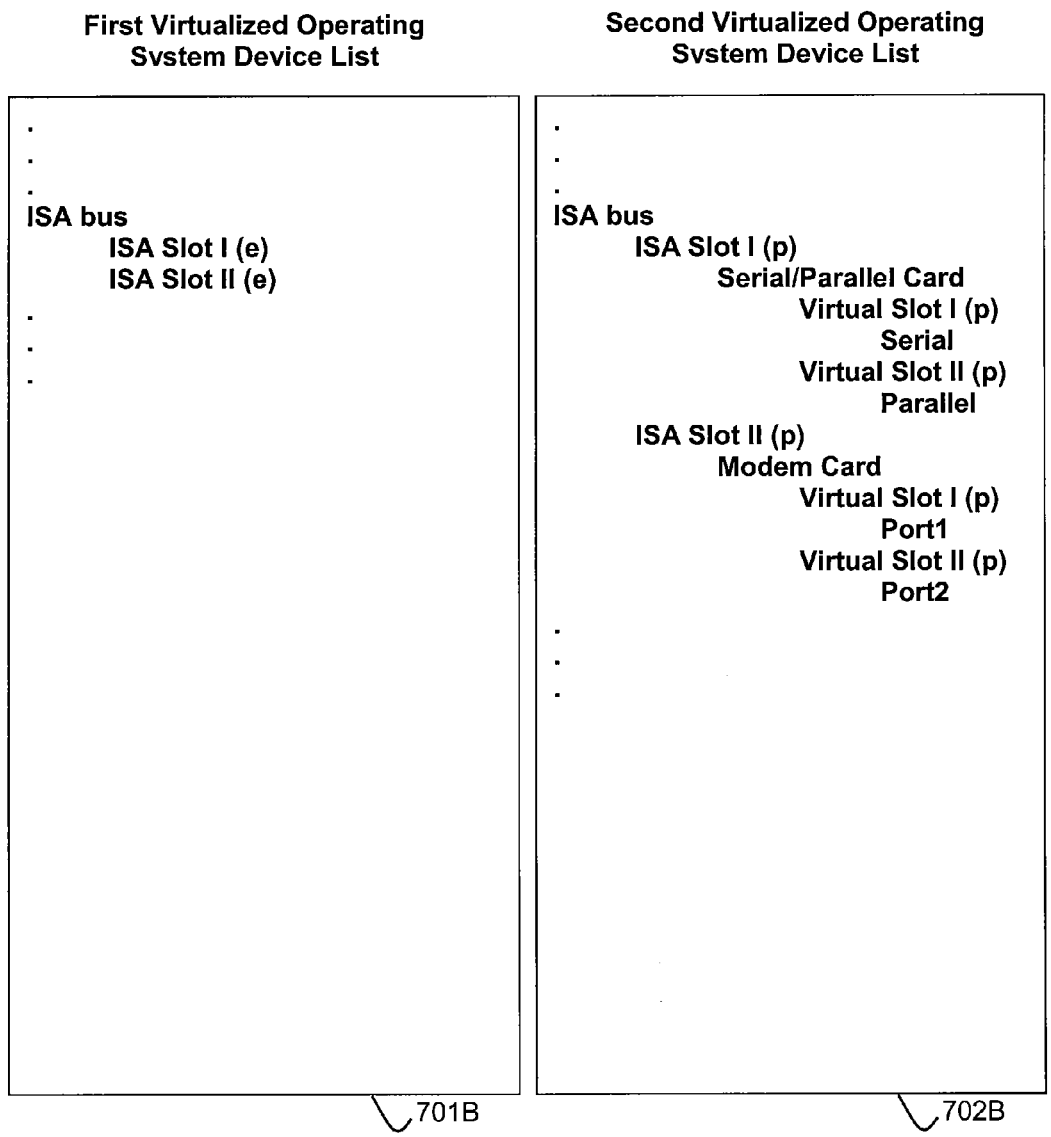
FIG. 7B is a diagram illustrating the example implementation of FIG. 7A after a virtual hot plug operating removing a device for the first virtualized operating system and adding the device for the second virtualized operating system.

FIGS. 7A-7C are block diagrams illustrating a third sample implementation of the performance of methods 200, 300A, and 300B by a processing unit of a computing device, such as the computing device 101. In this example, the processing unit of the computing device is executing a first virtualized operating system and a second virtualized operating system within an operating system executing on the processing unit. FIG. 7A illustrates a portion of the first virtualized device list 701A for the first virtualized operating system that corresponds to an ISA bus and a portion of the second virtualized device list 702A for the second virtualized operating system that corresponds to the ISA bus. It is understood that the illustrated portions of the first virtualized device list 701A and the second virtualized device list 702A are simplified for purposes of example and that the actual device lists for the first virtualized operating system and second virtualized operating system may contain other nodes corresponding to other aspects of the computing device other than the ISA bus and nodes of the actual device lists may include more information for interacting with devices connected to the computing device than illustrated.

As illustrated, the first virtualized device list 701A and the second virtualized device list 702A each include a virtualized bus node for the ISA bus. In this example the ISA bus includes two interfaces and the first virtualized device list 701A and the second virtualized device list 702A each include a virtualized interface node (ISA Slot I and ISA slot II) for each of the two interfaces.

In the first virtualized device list 701A, the ISA Slot I virtualized interface node includes a child virtualized device node for a Serial/Parallel Card device and a status indicator indicating that the Serial/Parallel Card device is present, i.e. accessible by the first virtualized operating system via ISA Slot I. The ISA Slot II virtualized interface node in the first virtualized device list 701A does not include a child virtualized device node and the status indicator for the ISA Slot II virtualized interface node indicates that the ISA Slot II interface is empty, i.e. there is no device accessible by the first virtualized operating system via ISA Slot II.

In the second virtualized device list 702A, the ISA Slot I virtualized interface node does not include a child virtualized device node and the status indicator for the ISA Slot I virtualized interface node indicates that the ISA Slot I interface is empty, i.e. there is no device accessible by the second virtualized operating system via ISA Slot I. The ISA Slot II virtualized interface node interface node includes a child virtualized device node for a Modem Card device and a status indicator indicating that the Modem Card device is present, i.e. accessible by the second virtualized operating system via ISA Slot II.

In this example, the Serial/Parallel Card device includes two virtual devices, or separately utilizable serial port and parallel port. This is illustrated in the first virtualized device list 701A as the two virtualized virtual interface nodes (Virtual Slot I and Virtual Slot II) that are child nodes of the Serial/Parallel Card virtualized device node. Virtual Slot I includes a child virtualized virtual device node Serial and a status indicator indicating that Serial is accessible by the first virtualized operating system. Virtual Slot II includes a child virtualized virtual device node Parallel and a status indicator indicating that Parallel is accessible by the first virtualized operating system.

Also in this example, the Modem Card device includes two virtual devices, or separately utilizable modem ports. This is illustrated in the second virtualized device list 702A as the two virtualized virtual interface nodes (Virtual Slot I and Virtual Slot II) that are child nodes of the Modem Card virtualized device node. Virtual Slot I includes a child virtualized virtual device node Port1 and a status indicator indicating that Port1 is accessible by the second virtualized operating system. Virtual Slot II includes a child virtualized virtual device node Port2 and a status indicator indicating that Port2 is accessible by the second virtualized operating system.

FIG. 7B illustrates the first virtualized device list 701B and the second virtualized device list 702B after the performance of a virtual hot plug operation utilizing the first virtualized device list 701A and the second virtualized device list 702A that removes the Serial/Parallel Card device for the first virtualized operating system and adds the Serial/Parallel Card device for the second virtualized operating system. As illustrated, the virtualized device node for the Serial/Parallel Card device, as well as all child nodes of the Serial/Parallel Card virtualized device node, has been removed from the first virtualized device list 701B and the status indicator for the ISA Slot I virtualized interface node has been updated to indicate that the Serial/Parallel Card device is not accessible by the first virtualized operating system via ISA Slot I. Also as illustrated, a virtualized device node for the Serial/Parallel Card device, as well as all child nodes of the Serial/Parallel Card virtualized device node, has been added to the second virtualized device list 702B and the status indicator for the ISA Slot I virtualized interface node has been updated to indicate that the Serial/Parallel Card device is accessible by the second virtualized operating system via ISA Slot I.

FIG. 7C illustrates the first virtualized device list 701C and the second virtualized device list 702C after the performance of a virtual hot plug operation utilizing the first virtualized device list 701A and the second virtualized device list 702A that removes the Port2 virtual device for the second virtualized operating system and adds the Port2 virtual device for the first virtualized operating system. As illustrated, the virtualized virtual device node for the Port2 virtual device has been removed from the second virtualized device list 702C and the status indicator for the Virtual Slot II virtualized virtual interface node has been updated to indicate that the Port2 virtual device is not accessible by the second virtualized operating system. Also as illustrated, a virtualized virtual device node for the Port2 virtual device has been added to the first virtualized device list 701C. In order for the Port2 virtualized virtual device node to be added in the correct position in the first virtualized device list 701C, a virtualized device node (as well as child virtualized virtual interface nodes Virtual Slot I and Virtual Slot II) for the Modem Card device has been added to the first virtualized device list 701C and the status indicator for the ISA Slot II virtualized interface node indicates that the Modem Card device is accessible by the first virtualized operating system via ISA Slot II. Also, the Virtual Slot II virtualized interface node status indicator indicates that the Port2 virtual device is accessible by the first virtualized operating system.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readably by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for virtual hot plugging at least one of a device or a virtual device, comprising:
    utilizing at least one processing unit, creating a device list for an operating system executing on a computing device, the device list stored in at least one computer readable medium, the operating system operable to interact with a plurality of devices utilizing the device list;
    utilizing the at least one processing unit, creating a bus node in the device list for each bus connected to the computing device, each bus including a plurality of interfaces;
    utilizing the at least one processing unit, creating a plurality of interface nodes in the device list, each of the plurality of interface nodes corresponding to one of the plurality of interfaces, the plurality of interface nodes being child nodes of the respective bus node, each interface node including a status indication that indicates whether one of the plurality of devices is accessible by the operating system via the corresponding one of the plurality of interfaces;
    utilizing the at least one processing unit, creating a device node in the device list, the device node corresponding to a device of the plurality of devices that is accessible by the operating system via an interface of the plurality of interfaces, the device node being a child node of the interface node that corresponds to the interface, the device including a plurality of virtual devices;
    utilizing the at least one processing unit, creating a plurality of virtual interface nodes in the device list, each of the plurality of virtual interface nodes corresponding to one of the plurality of virtual devices, the plurality of virtual interface nodes being child nodes of the device node, each virtual interface node including a status indicator that indicates whether the virtual device is accessible by the operating system; and
    utilizing the at least one processing unit, performing at least one of adding or removing at least one of one of the plurality of devices utilizing at least the device list or one of the plurality of virtual devices utilizing at least the device list.

2. The method of claim 1, wherein said performing at least one of adding or removing at least one of one of the plurality of devices utilizing at least the device list or one of the plurality of virtual devices utilizing at least the device list comprises:
    adding a new device for the operating system, the new device coupled to an additional interface of the plurality of interfaces, by:
        adding a new device node for the new device to the device list as a child node of the interface node that corresponds to the additional interface;
        updating the status indicator of the interface node to indicate that the new device is accessible by the operating system via the additional interface; and
        loading at least one driver for the new device in the operating system.

3. The method of claim 1, wherein said performing at least one of adding or removing at least one of one of the plurality of devices utilizing at least the device list or one of the plurality of virtual devices utilizing at least the device list comprises:
    removing one of the plurality of devices for the operating system by:
        updating the status indicator of the interface node that is a parent node of the device node for the one of the plurality of devices to indicate that the one of the plurality of devices is not accessible by the operating system via the interface;
        removing the device node for the one of the plurality of devices from the device list; and
        unloading at least one driver for the one of the plurality of devices from the operating system.

4. The method of claim 1, wherein said performing at least one of adding or removing at least one of one of the plurality of devices utilizing at least the device list or one of the plurality of virtual devices utilizing at least the device list comprises:
    adding a new virtual device for the operating system by:
        adding a new virtual device node for the new virtual device to the device list as a child node of the virtual interface node that corresponds to the new virtual device;
        updating the status indicator of the virtual interface node to indicate that the new virtual device is accessible by the operating system; and
        loading at least one driver for the new virtual device in the operating system.

5. The method of claim 1, wherein said performing at least one of adding or removing at least one of one of the plurality of devices utilizing at least the device list or one of the plurality of virtual devices utilizing at least the device list comprises:
    removing a virtual device for the operating system by:
        updating the status indicator of the virtual interface node that corresponds to the virtual device to indicate that the virtual device is not accessible by the operating system;
        removing a virtual device node for the virtual device from the device list, the virtual device node being a child node of the virtual interface node; and
        at least one driver for the virtual device from the operating system.

6. The method of claim 1, further comprising:
    utilizing the at least one processing unit, creating a virtualized device list for a virtualized operating system executing in the operating system on the computing device, the virtualized device list stored in the at least one computer readable medium, the virtualized operating system operable to interact with the plurality of devices utilizing the virtualized device list;
    utilizing the at least one processing unit, creating a virtualized bus node in the virtualized device list for each bus connected to the computing device;
    utilizing the at least one processing unit, creating a plurality of virtualized interface nodes in the virtualized device list, each of the plurality of virtualized interface nodes corresponding to one of the plurality of interfaces, the plurality of virtualized interface nodes being child nodes of the respective virtualized bus node, each virtualized interface node including a status indicator that indicates whether one of the plurality of devices is accessible by the virtualized operating system via the corresponding one of the plurality of interfaces;
    utilizing the at least one processing unit, creating a virtualized device node in the virtualized device list, the virtualized device node corresponding to a device of the plurality of devices that is accessible by the virtualized operating system via an interface of the plurality of interfaces, the virtualized device node a child node of the virtualized interface node that corresponds to the interface, the device including a plurality of virtual devices;
    utilizing the at least one processing unit, creating a plurality of virtualized virtual interface nodes in the virtual device list, each of the plurality of virtualized virtual interface nodes corresponding to one of the plurality of virtual devices, as child nodes of the virtualized device node, each virtual interface node including a status indicator that indicates whether the virtual device is accessible by the virtualized operating system.

7. The method of claim 6, wherein said performing at least one of adding or removing at least one of one of the plurality of devices utilizing at least the device list or one of the plurality of virtual devices utilizing at least the device list comprises:
    adding a new device for the virtualized operating system, the new device coupled to an additional interface of the plurality of interfaces, by:
        adding a new virtualized device node for the new device to the virtualized device list as a child node of the virtualized interface node that corresponds to the additional interface;
        updating the status indicator of the virtualized interface node to indicate that the new device is accessible by the virtualized operating system via the additional interface; and
        loading at least one driver for the new device in the virtualized operating system.

8. The method of claim 6, wherein said performing at least one of adding or removing at least one of one of the plurality of devices utilizing at least the device list or one of the plurality of virtual devices utilizing at least the device list comprises:
    removing one of the plurality of devices for the virtualized operating system by:
        updating the status indicator of the virtualized interface node that is a parent node of the virtualized device node for the one of the plurality of devices to indicate that the one of the plurality of devices is not accessible by the virtualized operating system via the interface;
        removing the virtualized device node for the one of the plurality of devices from the virtualized device list; and
        unloading at least one driver for the one of the plurality of devices from the virtualized operating system.

9. The method of claim 6, wherein said performing at least one of adding or removing at least one of one of the plurality of devices utilizing at least the device list or one of the plurality of virtual devices utilizing at least the device list comprises:
    adding a new virtual device for the virtualized operating system by:
        adding a new virtualized virtual device node for the new virtual device to the virtualized device list as a child node of the virtualized virtual interface node that corresponds to the new virtual device;
        updating the status indicator of the virtualized virtual interface node to indicate that the new virtual device is accessible by the virtualized operating system; and
        loading at least one driver for the new virtual device in the virtualized operating system.

10. The method of claim 6, wherein said performing at least one of adding or removing at least one of one of the plurality of devices utilizing at least the device list or one of the plurality of virtual devices utilizing at least the device list comprises:
    removing a virtual device for the virtualized operating system by:
        updating the status of the virtualized virtual interface node that corresponds to the virtual device to indicate that the virtual device is not accessible by the virtualized operating system;
        removing a virtualized virtual device node for the virtual device from the virtualized device list, the virtualized virtual device node being a child node of the virtualized virtual interface node; and
        unloading at least one driver for the virtual device from the virtualized operating system.

11. The method of claim 6, wherein said performing at least one of adding or removing at least one of one of the plurality of devices utilizing at least the device list or one of the plurality of virtual devices utilizing at least the device list comprises:
  removing one of the plurality of devices for the operating system and adding the one of the plurality of devices for the virtualized operating system.

12. The method of claim 6, wherein said performing at least one of adding or removing at least one of one of the plurality of devices utilizing at least the device list or one of the plurality of virtual devices utilizing at least the device list comprises:
  removing a virtual device for the operating system and adding the virtual device for the virtualized operating system.

13. The method of claim 6, wherein performing at least one of adding or removing at least one of one of the plurality of devices utilizing at least the device list or one of the plurality of virtual devices utilizing at least the device list comprises:
  removing one of the plurality of devices for the virtualized operating system and adding the one of the plurality of devices for the operating system.

14. The method of claim 6, wherein said performing at least one of adding or removing at least one of one of the plurality of devices utilizing at least the device list or one of the plurality of virtual devices utilizing at least the device list comprises:
  removing a virtual device for the virtualized operating system and adding the virtual device for the operating system.

15. A method for virtual hot plugging at least one of a device or a virtual device, comprising:
  utilizing at least one processing unit, creating at least one virtualized device list for at least one virtualized operating system executing in an operating system on a computing device, the at least one virtualized device list stored in at least one computer readable medium, the at least one virtualized operating system operable to interact with a plurality of devices utilizing the at least one virtualized device list;
  utilizing the at least one processing unit, creating a virtualized bus node in the at least one virtualized device list for each bus connected to the computing device;
  utilizing the at least one processing unit, creating a plurality of virtualized interface nodes in the at least one virtualized device list, each of the plurality of virtualized interface nodes corresponding to one of the plurality of interfaces, the plurality of virtualized interface nodes being child nodes of the respective virtualized bus node, each virtualized interface node including a status indicator that indicates whether one of the plurality of devices is accessible by the at least one virtualized operating system via the corresponding one of the plurality of interfaces;
  utilizing the at least one processing unit, creating a virtualized device node in the at least one virtualized device list, the virtualized device node corresponding to a device of the plurality of devices that is accessible by the at least one virtualized operating system via an interface of the plurality of interfaces, the virtualized device node being a child node of the virtualized interface node that corresponds to the interface, the device including a plurality of virtual devices;
  utilizing the at least one processing unit, creating a plurality of virtualized virtual interface nodes in the at least one virtual device list, each of the plurality of virtualized virtual interface nodes corresponding to one of the plurality of virtual devices, the plurality of virtualized virtual interface nodes being child nodes of the virtualized device node, each virtual interface node including a status indicator that indicates whether the virtual device is accessible by the at least one virtualized operating system; and
  utilizing the at least one processing unit, performing at least one of adding or removing at least one of one of the plurality of devices utilizing at least the at least one virtualized device list or one of the plurality of virtual devices utilizing at least the at least one virtualized device list.

16. The method of claim 15, wherein said performing at least one of adding or removing at least one of one of the plurality of devices utilizing at least the at least one virtualized device list or one of the plurality of virtual devices utilizing at least the at least one virtualized device list comprises at least one of:
  adding a new device for the at least one virtualized operating system, the new device coupled to an additional interface of the plurality of interfaces, by:
    adding a new virtualized device node for the new device to the at least one virtualized device list as a child node of the virtualized interface node that corresponds to the additional interface;
    updating the status indicator of the virtualized interface node to indicate that the new device is accessible by the at least one virtualized operating system via the additional interface; and
    loading at least one driver for the new device in the at least one virtualized operating system; or
  adding a new virtual device for the at least one virtualized operating system by:
    adding a new virtualized virtual device node for the new virtual device to the at least one virtualized device list as a child node of the virtualized virtual interface node that corresponds to the new virtual device;
    updating the status indicator of the virtualized virtual interface node to indicate that the new virtual device is accessible by the at least one virtualized operating system; and
    loading at least one driver for the new virtual device in the at least one virtualized operating system.

17. The method of claim 15, wherein said performing at least one of adding or removing at least one of one of the plurality of devices utilizing at least the at least one virtualized device list or one of the plurality of virtual devices utilizing at least the at least one virtualized device list comprises at least one of:
  removing one of the plurality of devices for the at least one virtualized operating system by:
    updating the status indicator of the virtualized interface node that is a parent node of the virtualized device node for the one of the plurality of devices to indicate that the one of the plurality of devices is not accessible by the at least one virtualized operating system via the interface;
    removing the virtualized device node for the one of the plurality of devices from the at least one virtualized device list; and
    unloading at least one driver for the one of the plurality of devices from the at least one virtualized operating system; or
  removing a virtual device for the at least one virtualized operating system by:

updating the status indicator of the virtualized virtual interface node that corresponds to the virtual device to indicate that the virtual device is not accessible by the at least one virtualized operating system;

removing a virtualized virtual device node for the virtual device from the at least one virtualized device list, the virtualized virtual device node being a child node of the virtualized virtual interface node; and unloading at least one driver for the virtual device from the at least one virtualized operating system.

18. The method of claim 15, wherein the at least one virtualized device list for the at least one virtualized operating system executing in the operating system comprises a first virtualized device list for a first virtualized operating system executing in the operating system and a second virtualized device list for a second virtualized operating system executing in the operating system and said performing at least one of adding or removing at least one of one of the plurality of devices utilizing at least the at least one virtualized device list or one of the plurality of virtual devices utilizing at least the at least one virtualized device list comprises:

removing one of the plurality of devices for the first virtualized operating system and adding the one of the plurality of devices for the second virtualized operating system.

19. The method of claim 15, wherein the at least one virtualized device list for the at least one virtualized operating system executing in the operating system comprises a first virtualized device list for a first virtualized operating system executing in the operating system and a second virtualized device list for a second virtualized operating system executing in the operating system and said performing at least one of adding or removing at least one of one of the plurality of devices utilizing at least the at least one virtualized device list or one of the plurality of virtual devices utilizing at least the at least one virtualized device list comprises:

removing a virtual device for the first virtualized operating system and adding the virtual device for the second virtualized operating system.

20. A system for virtual hot plugging at least one of a device or a virtual device, comprising:

at least one processing unit operable to execute at least one of an operating system or a virtualized operating system;

at least one tangible storage media, communicably coupled to the processing unit, at least one device list, stored in the at least one tangible storage media, utilizable by the at least one of the operating system or the virtualized operating system to interact with a plurality of devices, the at least one device list comprising:

a bus node for each bus connected to the at least one processing unit, each bus including a plurality of interfaces;

a plurality of interface nodes each corresponding to one of the plurality of interfaces, each interface node a child node of the respective bus node, each interface node including a status indicator that indicates whether one of the plurality of devices is accessible by the at least one of the operating system or the virtualized operating system via the corresponding one of the plurality of interfaces;

a device node, corresponding to a device of the plurality of devices that is accessible by the at least one of the operating system or the virtualized operating system via an interface of the plurality of interfaces, the device node a child node of the interface node that corresponds to the interface, the device including a plurality of virtual devices; and a plurality of virtual interface nodes each corresponding to one of the plurality of virtual devices, each of the plurality of virtual interface nodes a child node of the device node, each virtual device node including a status indicator that indicates whether the virtual device is accessible by the at least one of the operating system or the virtualized operating system;

wherein the at least one processing unit is operable to perform one of adding a new device for the at least one of the operating system or the virtualized operating system utilizing the at least one device list, removing one of the plurality of devices for the at least one of the operating system or the virtualized operating system utilizing the at least one device list, adding a new virtual device for the at least one of the operating system or the virtualized operating system utilizing the at least one device list or a virtualized device list, or removing a virtual device for the at least one of the operating system or the virtualized operating system utilizing the at least one device list or the virtualized device list.

* * * * *